United States Patent [19]

Witkin

[11] Patent Number: 4,658,372
[45] Date of Patent: Apr. 14, 1987

[54] SCALE-SPACE FILTERING

[75] Inventor: Andrew P. Witkin, Fremont, Calif.

[73] Assignee: Fairchild Camera and Instrument Corporation, Mountain View, Calif.

[21] Appl. No.: 494,194

[22] Filed: May 13, 1983

[51] Int. Cl.[4] .......................... G01S 13/00; G06K 9/62
[52] U.S. Cl. ...................................... 364/550; 364/572; 382/36; 342/191; 342/195
[58] Field of Search ............ 343/5 MM, 5 CF, 5 CM, 343/17; 364/550, 551, 572, 724, 728; 382/28, 36, 38

[56] References Cited

U.S. PATENT DOCUMENTS

| | | | |
|---|---|---|---|
| 3,964,064 | 6/1976 | Brandao et al. | 343/17 X |
| 4,062,012 | 12/1977 | Colbert et al. | 343/50 P X |
| 4,209,853 | 6/1980 | Hyatt | 343/17 X |
| 4,320,400 | 3/1982 | Chasek | 364/550 X |
| 4,326,259 | 4/1982 | Cooper et al. | 382/36 X |
| 4,388,491 | 6/1983 | Ohta et al. | 364/724 X |
| 4,396,903 | 8/1983 | Habicht et al. | 343/5 MM X |
| 4,453,218 | 6/1984 | Sperinde et al. | 364/572 X |

OTHER PUBLICATIONS

IEEE Proceeding, Aug. 1981 (vol. 128, PtF, No. 4); "Waser-Radar Signature Processing System"; G. A. Bundell, pp. 215-221.

Primary Examiner—Errol A. Krass
Assistant Examiner—Kevin J. Teska
Attorney, Agent, or Firm—Theodore S. Park; Kenneth Allen; Lee Patch

[57] ABSTRACT

Information indicative discrete events of interest imbedded in raw data are globally classified, or filtered with respect to scale and changes in the scale of observation to effect intelligent perception of phenomena. Large scale components are classified as events while small scale components of an identified event designate points of occurrence of the event. The invention has broad application in artificial intelligence and signal processing wherein perceived discrete events, including minima, maxima, inflections, cusps, and discontinuities have a significance other than as noise. Methods and apparatus are described which utilize the subject invention in signal processing applications.

12 Claims, 12 Drawing Figures

SCALE-SPACE FILTERING

BACKGROUND OF THE INVENTION

1. Field Of Invention

This invention relates to artificial intelligence and to signal processing. In particular, the invention relates to the classification or filtering of information derived from primitive perception for use in developing a description of observed events in the absence of prior knowledge about the significance of events.

Traditionally, phenomena such as physical objects, terrain, and the like are considered to have unique, "true" lengths, areas, volumes, tangents, and other metric properties. This "true" value is the one obtained in the limit, as some factor of scale of measurement goes to zero. For example, arc length is defined as the limit of a polygonal approximation to a curve, as the length of each side of the polygon goes to zero.

The traditional notion of length doesn't hold for a broad class of irregular physical structures and processes. The problem is that when measuring the length of, e.g., a coastline by polygonal approximation, the measured length increases without apparent bound as the length of the polygonal side decreases (intuitively, because the smaller "yardstick" conforms to ever smaller sub-bays and sub-peninsulas.) Since the limiting value is undefined (or at least uninteresting), there can be no meaningful evaluation of metric properties without reference to the scale at which the properties are measured (i.e., the length of the "yardstick," or some other parameter of scale.)

It has therefore been assumed that the choice of scale and range of scale is fundamentally a tradeoff between resolution and noise. A small scale observation can resolve closely spaced events but is sensitive to noise. A large scale observation blurs events but is less sensitive to noise. The scale threshold, which is often predetermined based on empirical factors for which there is no analytical model, frequently determines how events are defined. The inherent ambiguity in scale parameterization is often a serious problem, because there is usually no simple principled basis for setting the scale parameter. Thus, if a query is directed to how long, how wide, or how steeply inclined is an irregular physical structure or the function of a physical measurement process, there is no single "correct" answer, since the answer changes, sometimes significantly, as the scale of measurement is changed. The ambiguity of scale cannot in general be eliminated by any simple process; rather the problem as herein formulated is to reduce the ambiguity as much as possible and to present the alternatives in an organized, discrete, symbolic fashion.

One technique for circumventing the problem without really solving it has been simply to select a scale of observation based on a guess at a model for the relationship between the data collected and the conclusions desired. There nevertheless remains a need for a technique for analyzing raw continuous data to develop a discrete symbolic description which can be manipulated according to known analytical signal models.

It is to be understood that measurement of any sort requires at least some primitive scale parameterization in order to maintain a measurement of properties in a range of scale. The size of any neighborhood determines the scale of description. For example, a linear scale may be able to usefully present events for display with respect to an independent variable between zero and ten with a resolution of one part in one hundred. This represents a uniformly weighted scale range of three orders of magnitude. Various property measurement techniques may be applied within any scale range as, for example, local fitting of analytical functions to data, spatial averaging and the like. Each property measurement technique has in common the continuous parameterization by scale of some local measure on the signal.

As used herein a scale-dependent measure on a signal might be defined as a function of the signal, a function of a location on the signal, and a function of a parameter of scale, such that values in the signal contribute to the function's output to a diminishing degree as they become more distant from the original location; and such that the rate at which the values' contributions diminish with distance decreases as the value of the parameter of scale increases. A scale-dependent measure is for example the result of convolving the signal with a gaussian, using the gaussian's standard deviation ("width") as the parameter of scale.

2. Description Of The Prior Art

There are no known analytical signal models capable of describing different physical events which occur at different physical scales, namely, events which appear like noise within one scale but correspond to interesting events within another scale. More than twenty years of research in machine vision has yielded compelling evidence that even problems once considered to be comparatively simple, such as edge detection, are beyond the capabilities of known signal processing techniques as measured against performance of the human visual system. In fact, the human visual system is often capable of perceiving and distinguishing meaningful relationships among abstract, non-visual variables in graphs, scattergrams, histograms, perspective surface plots, radar returns and like non-visual event description and to organize data in terms of distinguished points, including peaks, steps and inflections, with far greater accuracy than any known signal processing technique.

The scale management problem has been addressed extensively in computer vision as for example the works of Rosenfeld, A. and Thurston, M. "Edge and Curve Detection for Visual Scene Analysis," IEEE Transactions on Computers, Vol. C-20, pp. 562–569 (May 1971), Marr, D. and Poggio, T. "A Computational Theory of Human Stereo Vision," Proc. R. Soc. Lond., B. 204 (1979) pp. 301–328, and Marr, D. and Hildreth, E. C. "Theory of Edge Detection," M.I.T. Artificial Intelligence Memo Number 518, Cambridge, Massachusetts (April 1979). However, the scale management problem has not been solved satisfactorily. For example, in Marr's works, it is suggested that multiple descriptions at a fixed series of mask sizes be used for observing events, the mask sizes corresponding to different scales and scale ranges. Marr was unable to integrate these multiple descriptions effectively. His choice of mask sizes or scale was largely motivated by neural physiological considerations.

SUMMARY OF THE INVENTION

According to the invention, a signal representing events of interest indicative of phenomena is characterized continuously at all observable scales in a scale-space. Discrete points at which new qualitative features appear in a scale-space image are identified by analysis of directional derivatives of the scale-space image in the direction of lines of constant scale. A discrete tree structure is constructed with reference to the nodes of occurrence of such events in the scale-space planes of the high order derivatives in order to identify features in successively finer detail without interference from noise. The tree structure may be viewed as a discrete description of a signal at all scales simultaneously or as defining an ordered family of descriptions at different scales. Each node may be assigned a value corresponding to the persistence of events with respect to scale. The value may be employed to identify for filtering purposes a feature of interest. The discrete character of the description permits filtering or categorization of events wherein perceptual scale dependence is an independent variable.

This invention is based on the discovery that there exists a possible correlation between significance of an event and the "persistence or stability" of a criterion related to a directional derivative of a scale-space image with respect to variation in scale of observation. By stability, it is meant the extent of persistence of an undistinguished interval of data with respect to variation in scale. Stability is not to be confused with the concept of mathematical stability indicative of a converging series.

This discovery suggests that events of significance in differing scales can be observed and identified simultaneously by selection of an appropriate scale of observation for a selected signal interval. The so-called "stability" criterion may be used as a guide to the selection of the scale of observation of particular events in a signal. The invention can be used to develop a discrete approximation in order to identify events from raw data observed in the physical world. Immediate applications include detection of phenomena where prior classical pattern recognition approaches have not provided adequate means to detect edges, line segments, corners, textures and other visual features in images, such as machine vision, data logging developed from signal returns representative of underground physical features, radar, ultrasound or any like phenomena.

According to the invention, no distinction is made between signal and noise in any absolute sense. Features extending over broad ranges of scale may be significant for coarse interpretation while features which extend over very narrow and highly resolved scales may be significant for refined interpretation. Thus, unlike other filtering methods where the object is noise reduction, the object of the present filtering technique is one of separating scale, nerghborhoods or descriptions into distinctly significant scale ranges. According to a preferred embodiment of the invention, the primitive operation providing local parameterization is the convolution of the properties with the normalized gaussian function wherein the standard deviation of this function is the independent variable representing the scale parameter. The gaussian function convolution provides the advantages of center weighting, which tends to preserve local properties. It is also useful in visual edge detection techniques. Other scale parameterization techniques are contemplated should they ultimately prove more efficient or effective, depending upon application.

According to a further aspect of the invention, signals representing phenomena to be analyzed are measured while substantially continuously varying scale range thereby to generate a signal with an extra dimension representing the signal at all scales. In the specific embodiment, measurement is made while continuously varying the standard deviation of a gaussian convolution mask. At the coarser scales, general features are identifiable which can be localized at the finer scales. Moreover, since new qualitative features appear at discrete points in the image of a scale-space plane or its derivatives, the continuous surface may be collapsed into a discrete tree structure. The discrete tree structure is well adapted to ordered analysis. Thus is a tree structure so generated which is capable of being interpreted as a description of a signal viewed simultaneously at all scales or as defining an ordered family of descriptions at different scales.

The technique according to the invention provides a powerful tool for signal analysis since discrete approximation can be developed through this technique without any prior knowledge of the signal or any threshold criteria about raw data. The invention has immediate application to well logging wherein underground features are reconstructed from raw data and to machine interpretation of complex visual images The invention will be better understood by reference to the following detailed description taken in connection with the accompanying drawings.

DESCRIPTION OF SPECIFIC EMBODIMENTS

Figure 1:
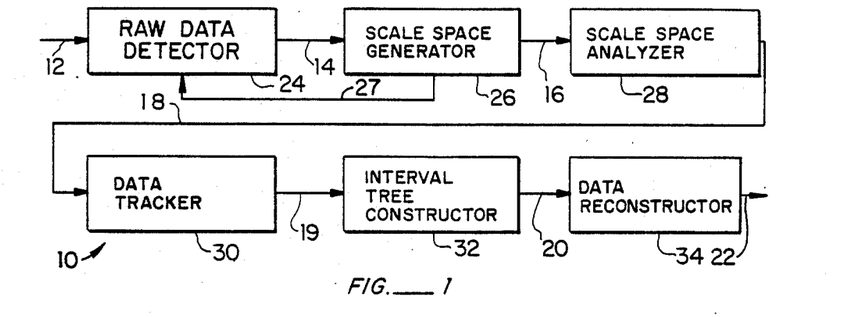
FIG. 1 is a block diagram of a generalized filtering system according to the invention.

FIG. 1 depicts a generalized filtering system 10 operative according to the invention. As used herein, the term filter refers in general to any mechanism for categorizing data and extracting information of interest. For simplicity, the system is explained with reference to a one dimensional signal, for example, a signal varying in amplitude only with respect to time. It should be understood, however, that the invention applies to multiple dimensional information as, for example, raw data which can be described in terms of multiple dependent variables which vary with respect to multiple independent variables, including time, space, amplitude, phase, frequency, etc.

As used herein signal lines and corresponding signals are assigned the same numerals, and analogous elements are assigned the same numeral throughout.

The filtering system 10 is responsive to raw data on a raw data signal line 12 to yield processed data on a signal output signal line 22. The processed data may be a reconstructed approximation of the raw data in which information of interest is highlighted.

The raw data signal line 12 is coupled to a raw data detector 24. The output of the raw data detector on a signal line 14 herein designated observed data signal line 14 is coupled to a scale-space generator 26. The scale of observation of the raw data detector 24 is controllable through a scale space parameter control line 27. The output of the scale-space generator 26, which is a signal representative of the observed data projected through scale-space, is provided on a scale-space signal line 16 to a scale-space analyzer 28. The output of the scale-space analyzer, which may be a derivative of the scale-space signal, such as the second derivative whereby contours of inflation are recorded as zeroes, is provided as analyzed data on analyzed data line 18 to a data tracker 30. The data tracker 30 generates a tracked signal as hereinafter explained on tracked signal line 19 which is coupled to an interval tree constructor 32. The interval tree constructor 32 generates an interval tree signal, as hereinafter explained, on interval tree signal line 20 which is coupled to a data reconstructor 34. The output of the data reconstructor is the desired processed data on system output signal line 22 and is a selected signal approximating the raw data having been processed by the filtering system 10 according to the invention. The function of a preferred construction of each of these elements will be apparent from the description hereinafter.

By way of further background, perception involves the manipulation of primitive data into meaningful relationships among variables imbedded in the primitive data. According to the present invention, it is an object to organize data in terms of distinguished points, such as peaks, steps and inflections in a signal and the intervals between such points. It has been found that a description in terms of such local features provides a useful alternative to unstructured numerical representation of data and provides appropriate primitives for matching and for more elaborate morphological descriptions and interpretation of data. Further, it has been found that there is significance in both large scale features and small scale or fine-structure features in the same signal interval depending upon the scale of observation. Moreover, the transition from scale to scale is not a continuum, but involves discrete steps among a few scales apparently inherent to the events associated therewith. In the present invention, the understanding of this phenomenon permits the elimination of ambiguity which would otherwise be introduced by limiting the scale range within data as perceived or by arbitrarily establishing a uniform scale.

It is, therefore, a primary objective of the present invention to provide means operative on primitive or raw data to automatically generate an orderly discrete family of meaningful descriptions capturing as nearly as possible discrete events in data as would be perceived and identified by a highly intelligent observer, such as an animal or a human being.

Figure 2:
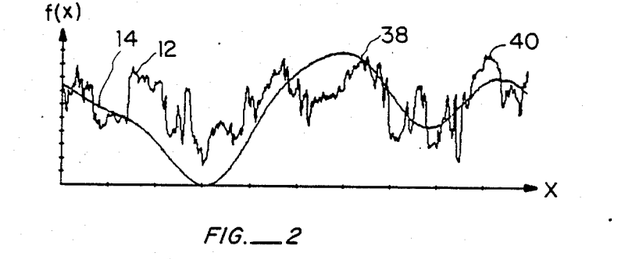
FIG. 2 is a waveform diagram of a one dimensional raw data signal with respect to an independent variable such as time whereupon is superimposed a prescaled detected data signal.

In order for raw data to be perceived meaningfully, it is necessary that the data be detected at some meaningful scale. Since, in the present invention, there is no prior knowledge of what is a meaningful scale, the first element of the invention is an adjustable scale raw data detector 24. Referring to FIG. 2, there is shown a representation of raw data 12 in the form of a continuum in variations in amplitude as a function of an independent variable x. The variable may represent time, distance or the like. The amplitude range shown herein involves a scale, a neighborhood, or a resolution of about one and one-half (1½) orders of magnitude.

Detection can be described as the measurement of neighborhood properties wherein the size of the neighborhood properties determines the scale. The detection scheme, according to a preferred embodiment of the invention, involves the primitive operation of the convolution of the raw data with a function which is dually dependent on the independent variable or variables in the data and on a scale parameter. Specifically, the normalized center-weighted gaussian function, which is given by the expression:

$$g(x,\sigma) = \frac{1}{\sigma\sqrt{2\pi}} e^{-\frac{x^2}{2\sigma^2}}$$

where x is the independent variable of the data and $\sigma$, the standard deviation of the gaussian function, is the scale parameter. The convolution of the gaussian function with the data provides several advantages. First, since the operator is center-weighted, it tends to preserve local properties. At minimum standard deviation, maximum local properties are preserved. Second, the operator is a continuous differentiable function of x and $\sigma$. Therefore, scale-parameterized derivatives can be obtained at each point as a function of a continuous scale parameter. This characteristic is important to the analysis of the characteristics of the raw data.

Referring again to FIG. 2, there is shown a waveform 14 corresponding to the signal on signal line 14 which represents data detected with an arbitrary parameter of scale. The signal is a gaussian smoothed representation of the raw data signal 12. It will be immediately apparent that the observed data signal 14 does not fully characterize the raw data signal 12 although it does characterize more or less significant features of the raw data signal. According to the invention, means are provided for characterizing the raw data signal 12 at all scales in terms of a surface swept out by continuously varying the standard deviation of a gaussian convolution mask. Referring to FIG. 1, the scale-space parameter control line 27 may have the function of conveying the signal for varying the mask width, and specifically the standard deviation parameter of the gaussian convolution mask, in order to generate a family of descriptions of the raw data 12 in scale-space.

Figure 3:
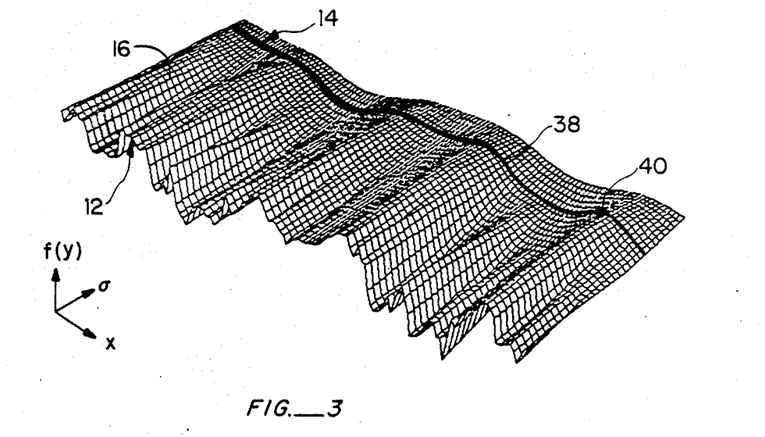
FIG. 3 is a perspective view of a portion of a convolution surface in scale-space.

FIG. 3 depicts a three dimensional scale-space signal 16 as would be generated on scale-space signal line 16 (FIG. 1). The observed data signal 14 of FIG. 2 is shown as a contour line paralleling the x axis of the scale-space surface 16 of FIG. 3. The scale-space surface 16 has been truncated at this boundary merely for the ease of illustration. The scale-space 16 may be extended in either direction along the scale parameter axis.

Figures 4, 5:
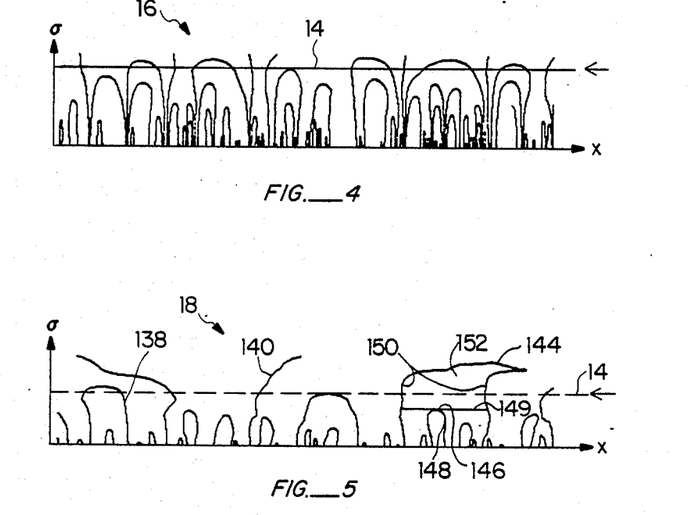
FIG. 4 is a contour plot in scale space of the convolution surface of FIG. 3.
FIG. 5 is a contour plot of the second derivative of the surface of FIG. 3 illustrating contours of the locations of the points of inflection in scale-space.

The surface 16 of FIG. 3 is defined by the function:

$$F(x,\sigma) = f(x) * g(x,\sigma) = \int_{-\infty}^{\infty} f(u) \frac{1}{\sigma\sqrt{2\pi}} e^{-\frac{(x-u)^2}{2\sigma^2}} du$$

where "*" denotes convolution with respect to the independent variable x and u is a dummy variable of integration. The convolution function F (x,$\sigma$) of Equation 2 is herein denoted the scale-space representation of the signal f(x) which is the raw data signal 12. Thus, F(x,$\sigma$) is the scale space signal 16. FIG. 4 illustrates the projection of the scale-space signal 16 in a contour plot in the plane formed by the orthogonal variables x and $\sigma$. Each of the contours indicates isoplanar magnitudes of the function F(x,$\sigma$).

An important feature of the invention is that the convolution function F(x,$\sigma$) is in general continuous and differentiable even when the input signal f(x) is not. The derivatives of the convolution function with respect to the independent variable x are given by the expression:

$$\frac{\partial^n}{\partial x^n} F(x,\sigma) = f(x) * \frac{\partial^n}{\partial x^n} g(x,\sigma)$$

where the derivatives of the gaussian function are readily obtained.

To develop a scale-dependent description of a subject function f(x), the extrema in the x direction of the F(x,$\sigma$) function and its derivatives with respect to x provide useful benchmarks. The extrema in the raw data signal 12 (FIG. 2) are points in the observed data signal 14, such as first extremum 38 or second extremum 40. FIG. 5 illustrates the extrema of FIG. 2 derived from plotting the zero contours in the second derivative, with respect to $\sigma$, of the convolution surface illustrated in FIG. 3. The representation of FIG. 5 is the analyzed data 18 wherein a first contour 138 and a second contour 140 in accordance with well understood mathematical rules, are zeroes in the second derivative corresponding to inflections in the function under analysis. The contours, as shown in FIG. 5 in the plane of analyzed data 18 thus reveal qualitative articulation of the signal under consideration wherein new features appear and existing ones sharpen or are localized with increasing resolution. More particularly, with each inflection or with each interval between inflections is associated a value of $\sigma$ at which a feature in the signal under consideration first appears. In the particular data under examination, primary interest is in step transitions. Therefore, attention may be limited for simplicity to extrema in slope.

The analyzed data 18 of FIG. 5, representing the zero contours on the differentiated convolution surface is processed by the data tracker 30 (FIG. 1) to extract simple qualitative features without undesirable spatial distortion of the location of those features with respect to the function x. The procedure, hereinafter called localization by coarse-to-fine tracking, comprises the following steps:

After computation of the second-derivative of the scale-space image with respect to x to obtain the analyzed data signal 18, all of the second derivative zeroes passing through a given value of x are found and then each such zero is tracked through successively smaller values of $\sigma$ to the finest scale. The resulting sequence of points gives the localized extrema-slope points on the signal for the selected maximum value of $\sigma$. (In other words, the scale-space analyzer simply extracts the second derivative, and the data tracker maps the values for the second derivative across the differentiated convolution surface.)

Figure 9:
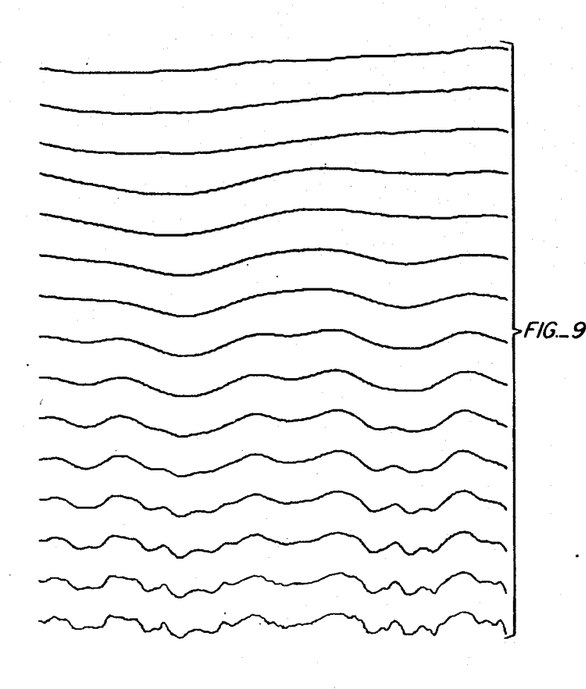
FIG. 9 is a family of contours obtained from successively finer gaussian convolutions of a raw data signal.
Figure 10:
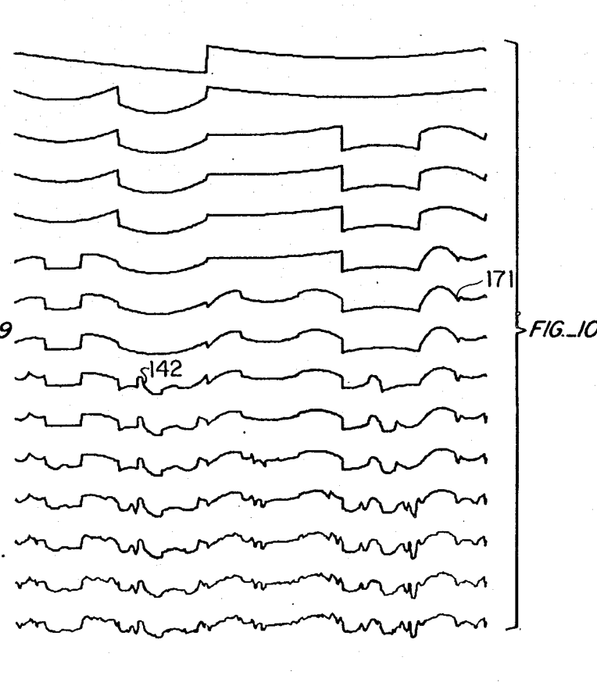
FIG. 10 is a plot of a family of signals with respect to a raw data signal which has been reconstructed based on a stationary variance approximation.

Referring to FIGS. 9 and 10 together, there is shown an example of coarse-to-fine tracking according to the invention (FIG. 10) wherein data is reconstructed by fitting least squares-type parabolas between inflection points and standard gaussian smoothing (FIG. 9) is employed to filter the raw data signal. In FIG. 9, gaussian smoothing quickly dampens all high frequency components as the value of $\sigma$ is increased. This also is seen in FIG. 3, which is a three dimensional representation of the data shown in FIG. 9. By contrast, however, the filtering procedure illustrated in FIG. 10 shows the retention of high frequency components at full amplitude accurately localized with respect to x with increasing values of $\sigma$. Significant features disappear only when an inflection associated with a feature also disappears in a second derivative scale-space image. One prominent high frequency feature has been labeled extremum 142. Again, significantly, prominent features maintain full amplitude as long as a feature retains its significance in scale-space. This characteristic allows for the assignment of a logical or binary value to a feature as a function of x and $\sigma$, which is extremely useful in decision making applications employing the raw data, such as edge detection and the like.

The coarse-to-fine tracking procedure is a non-linear filtering procedure which can be refined to further identify and categorize features of prominence within a particular scale range. Whereas exclusion or inclusion of features in the description of a signal is determined somewhat haphazardly by the values selected for $\sigma$ in the scale-space at which tracking begins, according to a further feature of the present invention, a process is provided for capturing discretely the introduction of new features at successively finer scales. This process is implemented by providing an interval tree structure which provides localized discrete control whereby the space of potential descriptions of a feature is simultaneously far more tightly constrained yet far more flexible. Moreover, the process, according to the invention, provides a technique for a natural hierarchic ordering of the descriptions within the space.

Figure 6:
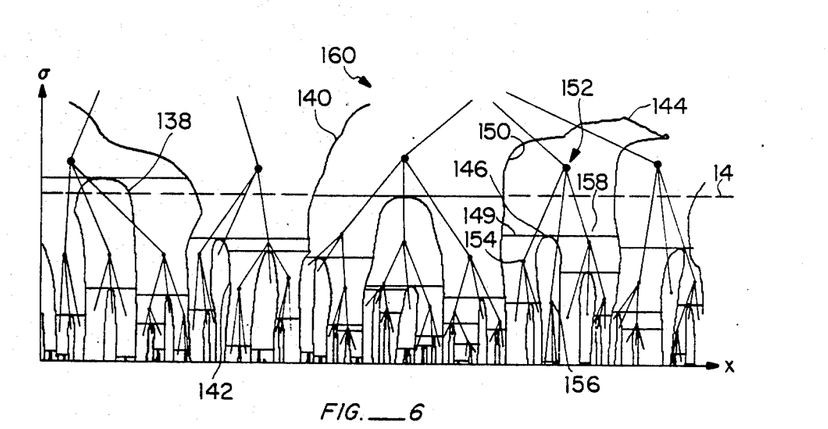
FIG. 6 is a scale-space tracking diagram of interval tree of the analyzed data of FIG. 5 wherein undistinguished intervals with respect to scale nodes are identified as nodes.

Referring to FIGS. 5 and 6, features of a signal in the scale-space image, in this case inflections, change continuously with a continuously variable value for $\sigma$ with new features appearing as feature extrema 145, 146 in contours, for example, contour 148 and contour 150. For every distinguished point, such as feature extrema 144 and 146, there is a dual, namely an undistinguished interval 152 between the extrema, with a decrease in $\sigma$ only increasing the precision of locality. An example of an undistinguished interval labeled 152 is the space within the boundary of contour 150 and scale value line 149 between extrema 144 and 156. Interval 152 is mapped into a rectangular region in FIG. 7 by tesselation in the x,$\sigma$ plane. It is bounded on x by the final value of the zero contours along the x axis of contour 150 and on the other two parallel sides by the extrema 144 and 146 along the $\sigma$ axis. Interval 152 resolves into three intervals, 154, 156 and 158 at the point of extrema 146 of relatively lower extremum value. With decreasing scale values, the subintervals resolve into further sets of subintervals at each feature introduction.

FIG. 6 is an illustration of a tree 160 constructed on the contours of FIG. 5. The tree is constructed by assembling the intervals such as 152, 154, 156 an 158 into an order based on source (parent) and branch (offspring).

As a part of the filtering process each node of the tree may be assigned a weight in accordance with the extent of the associated interval with respect to the $\sigma$ axis. Nodes with maximum weight may thereby be associated with features of significance. Significance may be based on the criterion that persistence in scale within a range of scale correlates with importance of the event associated with the node corresponding to the interval. The intervals with the selected weights are highlighted in FIG. 7.

A description of a signal in terms of a tree can be considered a description of the signal at all scales simultaneously or as a description of the signal as a family of single-scale descriptions, only one scale of which is considered relevant at any point along the x axis. The scale of description may be varied locally, that is, within each interval along the x axis, and the scale may be changed in well-defined steps as between scale values at feature introductions. Changes in scale may be effected by subdividing a node into its offspring, thereby moving towards smaller values of $\sigma$, or by merging, that is, combining related offspring into a common parent, thereby moving scale toward greater values of $\sigma$.

Figure 7:
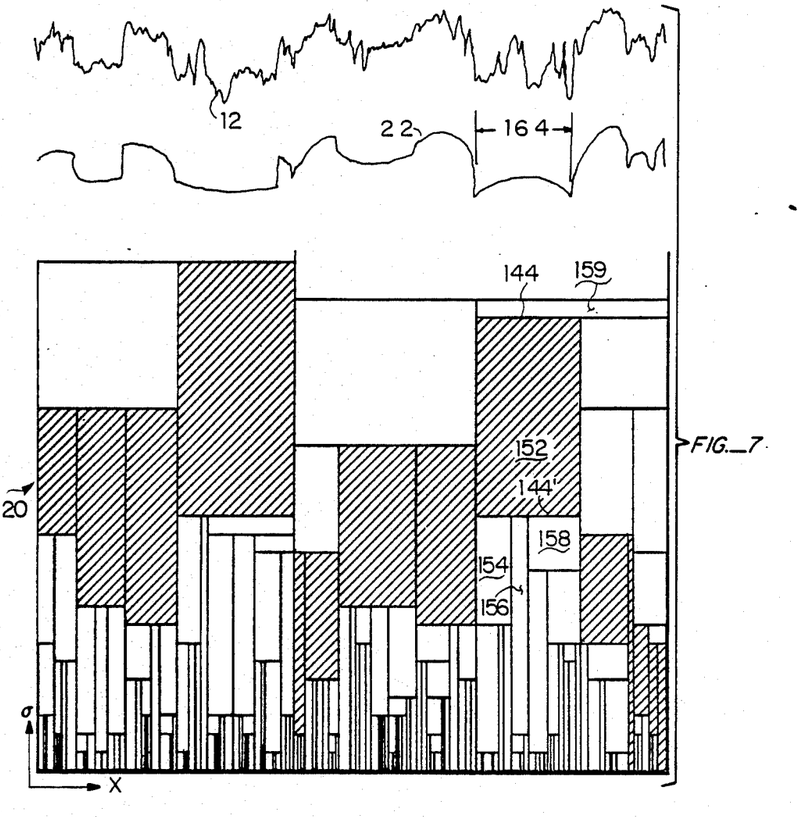
FIG. 7 is a tesselated data diagram of the tracked data of FIG. 6.

FIG. 7 illustrates a tesselation of the zero contours of the scale-space plane in the form of a two dimensional-interval signal 20. The interval signal 20 is derived directly from the analyzed data signal 18 (FIG. 5). In FIG. 7, a corresponding one dimensional raw data signal 12 is shown along the x axis parallel to the x axis of the two-dimensional interval signal 20. A different interval signal 20 would be generated if a different type of analyzed data were employed, as for example a signal based on contours of zeroes in the first derivative or contours of zeroes in the third derivative.

In order to present system output data 22 in the form of a minimum dimensional signal, the concept of undistinguished interval selection is introduced into scale-space and particularly selection based on stability of undistinguished intervals as a function of scale from FIG. 6. More specifically, there exists for all events in the x axis which define offspring at the minimum value of $\sigma$, an ancestor in its interval tree which best represents data of interest. The choice of ancestor may be based on maximum persistence over variation in scale (along the $\sigma$ axis). It has been observed that the stability of an undistinguished interval correlates reasonably well with perceptual salience to the intelligent (human) observer. For example, undistinguished interval 152 is the region having greatest stability as compared to undistinguished intervals 154, 156, 159 and the offspring of region 158 over the same interval of signal along the x axis. Therefore the boundaries, in x of range 164 of the undistinguished interval 152, have been selected to indicate significant events, such as an edge of a feature. According to the invention, undistinguished interval 152 and the $\sigma$ value corresponding to point 144 (FIG. 5) now tesselated to a line 144' (FIG. 7) becomes the reference for mapping raw data features along the x axis into a system output signal 22. A reconstructed interval 164 of system output data signal 22 (FIG. 7) is extracted from the raw data on the basis of reference to undistinguished interval 152. The shape of a reconstructed interval 164 may be obtained by fitting a least-squares parabola between the boundaries of the region 152 along the x axis, having determined and localized the boundaries by tracking the zeroes in the second-derivative to the minimum value of $\sigma$. Every other interval selected for system output signal 22 may be constructed in a similar manner based on reference to a selected undistinguished region with respect to the scale-space continuum.

Figure 8:
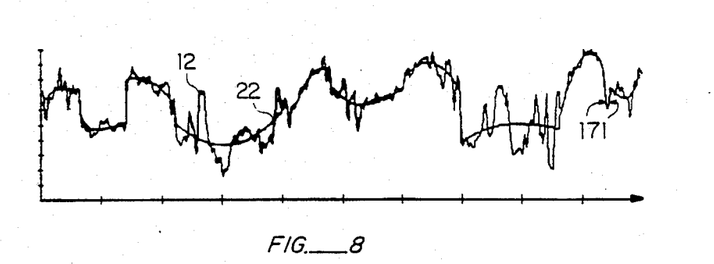
FIG. 8 is a waveform diagram of the raw data of FIG. 1 with superimposed thereon a signal approximation based on the maximum stability criteria according to the invention.

FIG. 8 illustrates a plot of the waveform of a one dimensional raw data signal 12 superimposed on a plot of the approximation for system output signal 22 wherein maximum stability criterion has been applied. High frequency structure is preserved in the output signal 22, as for example interval 171, where the high frequency structure is deemed to be of significance according to the stability criterion.

The invention has been applied to the analysis of gamma ray logs of geological formations with significant success. Segmentation on the basis of maximum stability by this filtering process has been found to correspond with remarkable accuracy to the tops of major sands as verified by trained geologists who have examined the raw data directly. Success with such geologic data suggests that the same techniques can be applied with reasonable success to other types of perceptual filtering tasks involving primitive shape description and identification.

According to the invention, therefore, a process for filtering raw data without prior knowledge of the perceptual salient features comprises the steps of generating a scale-space image of the raw data signal, as for example, computing a two dimensional surface by the convolution of the raw data signal with a continuum of gaussian functions wherein the signal is a one dimensional signal and the surface is a two dimensional surface;

identifying zero contours in the scale-space signal derivatives with respect to x and, in particular, identifying contours of zeroes in the second-derivative corresponding to inflections in the gaussian smoothed signal in order to identify distinguished points;

localizing the distinguished points by tracking the zero contours across the scale-space surface from coarse values of scale to fine values of scale in order to decouple undesirable metric distortion from signal simplification effected by signal smoothing;

selecting a scale of description for each salient feature with respect to the dimension of the raw data signal and, more particularly, applying a stability criterion to each interval to identify features having maximum stability with respect to changes in scale in order to excise from an interval description features whose persistence over scale changes is small; and reconstructing a data signal by fitting an approximating signal description between boundaries of each interval at the selected scale of description.

Figure 11:
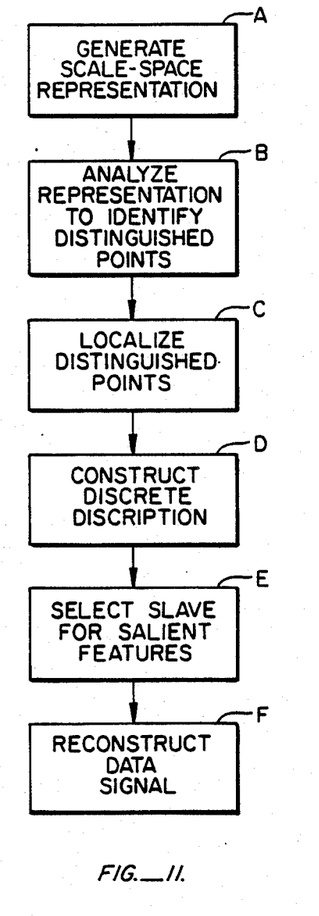
FIG. 11 is a flow chart representation of a method according to the invention.
Figure 12:
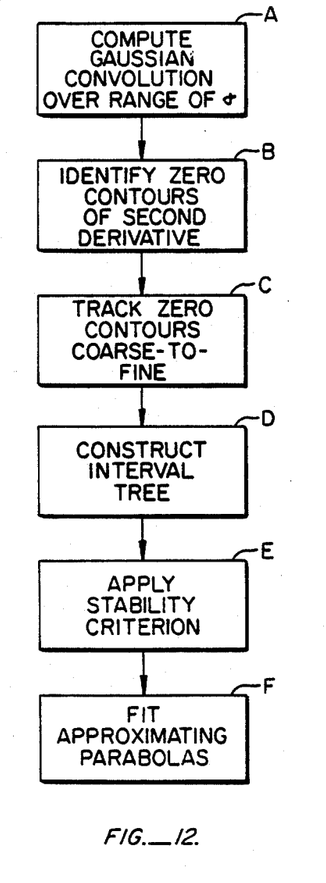
FIG. 12 is a flow chart representation of a specific embodiment of a method according to the invention.

FIGS. 11 and 12 describe the method of the invention in flow-chart form. FIG. 11 describes the method in general terms. FIG. 12 describes the method in terms of the specific embodiment described herein.

The steps illustrated in FIG. 11 are performed by the apparatus of FIG. 1, the correspondence being as follows: The generating step (A) is performed by the scale-space generator 26; the analyzing step (B) is performed by the scale-space analyzer 28; the localizing step (C) is performed by the data tracker 30; the constructing step (D) is performed by the interval tree constructor 32; and the selecting (E) and reconstructing (F) steps are performed by data reconstructor 34. The detailed steps of FIG. 12 correspond exactly to the steps of FIG. 11 and indicated by common reference designations.

The invention can be applied to virtually any type of filtering system, including time-domain filtering, frequency domain filtering and multi-dimensional domain filtering, particularly where there is no prior knowledge about the signal or the scale of description most relevant to the information contained in the signal. The invention has been explained with reference to specific embodiments. Other embodiments will be apparent to those of ordinary skill in the art upon reference to the description hereinabove. It is, therefore, not intended that this invention be limited, except as indicated by the appended claims.

I claim:

1. A method for classifying events, said events expressed in a detectable signal of at least a first dimension, said method comprising the steps of:
   mapping said signal into a substantially continuous scale-space representation in scale-space, said mapping characterizing said signal over scales within a range of observation resolution of said signal;
   analyzing said scale-space representation to identify distinguished points in said range of observation resolution in said scale-space, said distinguished points defining scale boundaries of said events;
   localizing said distinguished points to identify locations of said events in said at least first dimension; and
   constructing a discrete description of said signal from said locations of said events in said at least first dimension and from said scale boundaries.

2. The method according to claim 1 wherein said distinguished points are points of inflection of said signal with respect to said at least first dimension and said constructing step comprises mapping said points of inflection into regions of stability in said scale-space corresponding to intervals undistinguished by occurrence of observable inflections within variation of range in said scale-space.

3. The method according to claim 2 further comprising the step of identifying from said regions of stability selected regions of maximal stability as corresponding to events of significance.

4. The method according to claim 3 further comprising the step of reconstructing a signal approximating said identified events with respect to said at least first dimension.

5. An apparatus for classifying events, said events expressed in a detectable signal of at least a first dimension, said apparatus comprising:
   means for mapping said signal into a substantially continuous scale-space representation in scale-space, said mapping characterizing said signal over scales within a range of observation resolution of said signal;
   means coupled to said mapping means for analyzing said scale-space representation to identify distinguished points in said range of observation resolution in said scale-space, said distinguished points defining scale boundaries of said events;
   means coupled to said analyzing means for localizing said distinguished points to identify locations of said events in said at least first dimension; and
   means for constructing a discrete description of said signal from said locations of said events in said at least first dimension and from said scale boundaries.

6. The apparatus according to claim 5 wherein said distinguished points are points of inflection of said signal with respect to said at least first dimension and wherein said discrete description constructing means comprises means for mapping said points of inflection into regions of stability in said scale-space corresponding to intervals undistinguished by occurrence of observable inflections within variation of range in said scale-space.

7. The apparatus according to claim 6 further comprising means for identifying from said regions of stability selected regions of maximal stability as corresponding to events of significance.

8. The apparatus according to claim 5 further comprising means for reconstructing a signal approximating said identified events with respect to at least said first dimension.

9. An apparatus for filtering a signal, said signal being represented in the form of unscaled data, said apparatus comprising:
   means for describing said data over a range of scales of observation of said data;
   means coupled to said describing means for recognizing events within said data at a minimum scale of observation resolution within scale-space;
   means coupled to said events recognizing means for localizing occurrence of said events with respect to an independent variable of said signal;
   means coupled to said localizing means for classifying significance of said events; and
   means coupled to said classifying means for reconstructing a representation of said signal with respect to said independent variable at a plurality of scales based on significance classification of recognized events.

10. The apparatus according to claim 9 wherein said reconstruction means is operative to approximate transition between event regions defining an interval with respect to said independent variable.

11. The apparatus according to claim 10 wherein said reconstruction means is operative to register events designated by said classifying means as being of most significance within intervals of said independent variable.

12. The apparatus according to claim 9 wherein said reconstruction means is operative to register events designated by said classifying means as being of most significance within intervals of said independent variable.

* * * * *